3,216,987
PROPYLENE POLYMERIZATION IN THE PRESENCE OF AN ALUMINUM ALKYL DIHALIDE, TITANIUM TRICHLORIDE AND AN ALKYL PHOSPHONATE
John A. Price, Swarthmore, Pa., assignor to Avisun Corporation, Philadelphia, Pa., a corporation of Delaware
No Drawing. Filed Mar. 1, 1962, Ser. No. 176,761
17 Claims. (Cl. 260—93.7)

This invention relates to a novel catalyst system for the polymerization of propylene and higher alpha-olefins, and more particularly to a three component catalyst system consisting of alkyl aluminum sesquihalide or dihalide, titanium trichloride and an alkyl phosphonate.

It is known that alpha-olefins may be polymerized in the presence of catalysts comprising a transition metal halide such as titanium chloride in combination with an aluminum alkyl or dialkyl aluminum halide such as triethyl aluminum or diethyl aluminum monochloride to form solid crystalline polymers having utility in the fabrication of shaped articles, films, and fibers. However, it has not been found possible heretofore to use an alkyl aluminum dihalide or sesquihalide as an active component of this type of catalyst system even though these compounds are much less expensive than the alkyl aluminum compounds used thus far. Thus, Stuart and Khelghatian show in U.S. Patent 2,967,206, that alkyl aluminum dihalides in conjunction with titanium halides effect polymerization of propylene and higher olefins to oily polymers, but that no solid polymers are disclosed therein as resulting from the use of this catalyst system. While some polymer may be obtained using an aluminum sesquihalide-titanium trichloride catalyst, the yields are very low, and these catalysts are not of commercial interest. In recent years, many investigators have found that the addition of coordinating agents to organometallic transistion-metal halide catalyst systems improved the stereosymmetry of the polymer. Coover and Shearer (U.S. 2,951,066) used triphenylarsine in combination with ethylaluminum sesquichloride and titanium trichloride. Coover and Joyner (U.S. 2, 958,688) employed trialkyl-phosphites, trialkylphosphates and hexaalkylphosphoric triamides. Thomas (U.S. 2,909,511) pretreated alkyl-aluminum halides with groups IA and IIA metal halides prior to the addition of titanium trichloride in order to obtain greatly improved rates of polymerization and/or improved yields of crystalline polymer.

It is an object of this invention to provide a coordination catalyst system, utilizing an alkyl aluminum dihalide or sesquihalide as the organometallic component of the catalyst, which will polymerize propylene and higher olefins to solid crystalline polymers in commercially attractive yields.

It is a further object of this invention to provide an improved olefin polymerization catalyst consisting of alkyl aluminum dichloride or sesquichloride, pretreated with a phosphonate compound, before adding titanium trichloride.

Another object of this invention is the utilization of potentially cheap aluminum compounds, such as ethyl aluminum dichloride and ethyl aluminum sesquichloride in the polymerization of alpha-olefins.

It has been found according to the present invention that a catalyst system containing titanium trichloride, an alkyl aluminum dihalide or sesquihalide and an alkyl-phosphonate compound is effective in polymerizing propylene, and other 1-alkenes containing 2 to 20 carbon atoms and free from branching at the 2 position, to solid crystalline polymers. In a specific embodiment of this invention, an activated titanium trichloride is used with the alkylphosphonate compound and the alkyl aluminum dihalide or sesquihalide. This activated titanium trichloride is defined herein as being predominantly amorphous and may be prepared by ball, or rod, milling crystalline titanium trichloride, prepared by the reduction of titanium tetrachloride with hydrogen or aluminum until, as determined by X-ray diffraction, it possesses less than 30% of the crystalline structure of the crystalline titanium trichloride prior to ball or rod milling. In practice, the amount of crystallinity is generally 20% or less, and preferably it is 10% or less. Unlike the crystalline titanium trichloride from which it is derived, the predominantly amorphous titanium trichloride will catalyze the preparation of solid polymers of propylene and higher 1-alkenes when it is used in combination with an alkyl aluminum dihalide or sesquihalide. However, the amount of solid polymer so prepared is exceedingly small and such solid polymers can be obtained with such a system only when large, uneconomical amounts of the catalyst composition are used. It has been found, according to the present invention, that increases in polymerization yields as high as 180-fold may be obtained with the catalyst system containing an alkyl aluminum dihalide and predominantly amorphous titanium trichloride by complexing this system with an alkyl phosphonate compound.

In carrying out polymerizations in accordance with the present invention, the catalyst components are generally dissolved or suspended in an inert hydrocarbon solvent such as hexane, heptane, or octane, or mixtures thereof, in an appropriate reaction vessel, in the absence of oxygen and moisture. The catalyst-containing solvent is then usually brought to a temperature in the range of 25° C. to 150° C., preferably 60° C. to 80° C., and the olefin to be polymerized is introduced into the reaction vessel. When the olefin is a liquid at reaction temperatures, such as 4-methylpentene-1, atmospheric pressure may be used, but when the olefin is normally gaseous, such as propylene or butene-1, moderately elevated pressures are preferably used, as from 20 p.s.i.g. to 500 p.s.i.g., in order to increase the amount of olefin dissolved in the solvent, and thus speed the reaction.

The aluminum component of the catalyst system of this invention may be any alkyl aluminum dihalide, e.g., ethyl aluminum dichloride, propyl aluminum dichloride, butyl aluminum dichloride, or the corresponding bromine or iodine analogues, or sesquihalides such as aluminum ethyl sesquichloride or propyl sesquichloride as well as alkyl aluminum dihalides or sesquihalides, the alkyl radicals of which contain greater numbers of carbon atoms than those illustrated above. The phosphonate compound component suitable for this invention has the general formula $(RO)(R^1O)RPO$ wherein R and R' are selected from the group consisting of a lower alkyl group, and an aralkyl group, the alkyl group having 1 to 5 carbon atoms. The mol ratio of the alkyl aluminum compound to the phosphonate compound should be generally from about 1.1:1 to about 3:1. A practical working ratio lies in the range 1.3:1 to 2.5:1. The mol ratio of alkyl aluminum dihalide or sesquihalide to titanium trichloride in the catalyst system should be generally from 0.2:1 to 10:1, and is preferably from about 1.5:1 to 4:1.

In order that those skilled in the art may more fully appreciate the nature of my invention and the manner of carrying it out, the following controls and examples are given. In all examples the titanium component of the catalyst system was prepared by reducing titanium tetrachloride with aluminum and then ball milling the resultant titanium trichloride until its crystallinity was below about 10% of the original titanium trichloride as determined by X-ray analysis.

Example 1

A polymer bottle was charged with 0.112 gram of diethyl ethylphosphonate ($(EtO)_2EtPO$), 50 ml. of hexane, 0.90 ml. of 0.985 M ethyl aluminum dichloride in hexane and agitated at room temperature for 30 minutes. These amounts represent a mol ratio of 1.3:1 of the ethyl aluminum dichloride to the diethyl phosphonate. The bottle was then charged with a paraffin pellet containing 0.07 gram of $TiCl_3$. After aging at room temperature for 30 minutes, the bottle was put in the 72° C. bath and pressured with 40 p.s.i.g. of propylene for 4 hours. The unreacted propylene was vented and the cooled slurry was diluted with 10 ml. of methanol and 50 ml. of hexane. The polymer was collected on a sintered glass funnel, washed with 100 ml. portions of hexane, isopropanol, methanol and dried in a vacuum oven overnight at 60° C. The yield of dry white powdery polymer amounted to 7.5 grams. The reduced solution viscosity (RSV) of 0.1 gram of polymer in 100 ml. of Decalin at 135° C. was 10.7. The residue from evaporation of the combined hexane solutions weighed 0.6 gram.

Comparative Example A

A heavy-walled, pressure-type polymer bottle having a capacity of 185 ml. was charged with 3 ml. of hexane, 0.88 ml. of 1.03 M ethyl aluminum dichloride in hexane and a paraffin pellet containing 0.07 gram of $TiCl_3$. The slurry was agitated with a Teflon-coated magnetic stirrer for 30 minutes in a dry nitrogen atmosphere at room temperature. An additional 47 ml. of hexane was added, the bottle was sealed with a crown cap containing an oil-resistant liner and placed in a constant temperature bath maintained at 72° C.

The bottle was pressured with 40 p.s.i.g. of propylene which was maintained for a period of 4 hours. The unreacted propylene was vented and the cooled slurry was diluted with 10 ml. of methanol and 50 ml. of hexane. The polymer was collected on a sintered glass funnel, washed with 50 ml. portions of heptane, isopropanol, methanol and dried overnight in a vacuum oven at 60° C. The dry white powdery polymer weighed 0.05 gram. It will be noted in comparing the polymer yield in this example with the yield of Example 1, that there was a 150-fold increase in Example 1.

Example 2

A polymer bottle was charged with 0.113 gram of diethyl ethylphosphonate, 50 ml. of hexane and 1.8 ml. of 0.985 M ethyl aluminum dichloride in heptane. The mol ratio of the ethyl aluminum dichloride to the phosphonate was 2.7:1. The slurry was agitated with a Teflon-coated magnetic stirrer for 30 minutes in a dry nitrogen atmosphere at 25° C. The bottle was then charged with a paraffin pellet containing 0.07 gram of $TiCl_3$. After aging at 25° C. for additional 30 minutes, the bottle was placed in the 72° C. bath and pressured with 40 p.s.i.g. of propylene for 4 hours. The unreacted propylene was vented and the cooled slurry was diluted with 10 ml. of methanol and 50 ml. of hexane. The polymer was collected on a sintered glass funnel, washed with 100 ml. portions of hexane isopropanol, methanol and dried in a vacuum oven overnight at 60° C. The yield of dry, white powdery polymer amounted to 1.3 grams. The reduced solution viscosity (RSV) was 6.3. The residue from evaporation of the combined hexane solutions weighed 0.7 gram.

Example 3

Example 2 was repeated using 0.15 gram of diethylethylphosphonate instead of 0.113 gram. The mol ratio of ethyl aluminum dichloride to phosphonate was 2:1. The dry white powdery polypropylene weighed 5.0 grams. The reduced solution viscosity was 7.3. The residue from evaporation of the combined hexane solutions weighed 0.9 gram.

Example 4

Example 2 was repeated using 0.188 gram of diethyl ethylphosphonate instead of 0.133 gram. The mol ratio of ethyl aluminum dichloride to phosphonate was 1.6:1. The dry white powdery polypropylene weighed 7.9 grams. The reduced solution viscosity was 7.0. The residue from evaporation of the combined hexane solutions weighed 0.9 gram.

Example 5

Example 2 was repeated using 0.255 gram of diethyl ethylphosphonate instead of 0.113 gram. The mol ratio of ethyl aluminum dichloride to phosphonate was 4:3. The dry white powdery polypropylene weighed 9.1 grams. The reduced solution viscosity was 9.0. The residue from evaporation of the combined hexane solutions weighed 0.8 gram.

Comparative Example B

A polymer bottle was charged with 3 ml. of heptane, 1.95 ml. of 0.93 M ethyl aluminum dichloride in heptane and 1 paraffin pellet containing 0.07 gram of $TiCl_3$. After agitating for 90 minutes at 25° C., the slurry was diluted with an additional 47 ml. of heptane, capped, placed in the 72° C. bath pressured with 40 p.s.i.g. of propylene.

After 4 hours, the unreacted propylene was vented and the polymer was isolated, washed and dried in the same manner as that described in Example A. The dry white powdery polypropylene weighed 0.08 gram.

Example 6

Example 2 was repeated using 0.26 gram of diethyl ethylphosphonate instead of 0.113 gram. The mol ratio of diethyl ethylphosphonate to aluminum ethyl dichloride was 4:3.5. The yield of dry white powdery polymer amounted to 6.7 grams. The reduced solution viscosity (RSV) was 13.0. The residue from evaporation of the combined hexane solutions weighed 0.5 gram.

Example 7

Example 2 was repeated using 0.28 gram of dibutyl butylphosphonate ($BuO_2BuPO$) in place of 0.113 gram of diethyl ethylphosphonate. The mol ratio of the ethyl aluminum dichloride to phosphonate was 4:3. The dry white powdery polypropylene weighed 2.2 grams. The residue from evaporation of the combined hexane solutions weighed 1.0 gram.

Comparative Example C

A polymer bottle was charged with 50 ml. of hexane, 0.75 ml. of 1.80 M ethyl aluminum sesquichloride solution in heptane and 1 paraffin pellet containing 0.07 gram of $TiCl_3$ (Stauffer AA grade). The resulting slurry was aged in the 72° C. bath for 10 minutes, then pressured with 40 p.s.i.g. of propylene. After 4 hours the unreacted propylene was vented and the polymer was isolated, washed and dried in the same manner as that described in Example 1. The dry white powdery polypropylene weighed 2.8 grams and had a reduced solution viscosity (RSV) of 5.3. The residue from evaporation of the combined hexane solutions weighed 0.6 gram.

Example 8

A polymer bottle was charged with 50 ml. of hexane, 0.75 ml. of 1.80 M ethyl aluminum sesquichloride solution in heptane and 0.090 gram of diethyl ethylphosphonate. The solution was agitated for 30 minutes at 25° C. One paraffin pellet containing 0.07 gram of $TiCl_3$ was added and the slurry was agitated for an additional 35 minutes at 25° C. The bottle was then capped, placed in the 72° C. bath and pressured with 40 p.s.i.g. of propylene. At the end of 4 hours the unreacted propylene was vented and the polymer was isolated, washed and dried in the same manner as that described in Example 1. The yield of dry white powdery polypropylene amounted to 12.1 grams. The reduced solution viscosity (RSV) was 7.8. The residue from evaporation of the combined hexane solutions weighed 0.9 grams.

*Comparative Example D*

A polymer bottle was charged with 50 ml. of hexane, 1.8 ml. of 1.03 M ethyl aluminum dichloride solution in hexane and 1 paraffin pellet containing 0.07 gram of TiCl$_3$. As in the previous examples, the bottle was sealed with a crown cap containing an oil resistant liner and placed in the constant temperature bath maintained at 75° C. As before, agitation was accomplished by means of a Teflon-coated magnetic stirrer.

After ageing for 10 minutes, 20 ml. (13.2 grams) of 4-methyl-1-pentene was injected into the pressure bottle. The polymerization was run for 16 hours. The polymer was isolated, washed and dried in the same manner as that described for Example 1. The dry white powdery polymer weighed 0.50 gram and had a reduced solution viscosity (RSV) of 4.2. The residue from evaporation of the combined hexane solutions weighed 1.7 grams.

*Example 9*

Example D was repeated except that the solution of ethyl aluminum dichloride was pretreated for 30 minutes at 25° C. with 0.225 gram of diethyl ethylphosphonate. The yield of dry white poly-4-methyl-1-pentene amounted to 11.2 grams. The residue from evaporation of the combined hexane solutions weighed 1.3 grams. The increase in yield of Example 8 compared with Example D was 22 fold.

The invention claimed is:

1. In the polymerization of 1-alkenes free from branching at the 2 position and having from 2 to 20 carbon atoms having at least three carbon atoms to form solid crystalline polymers, the improvement which comprises catalyzing the polymerization with a mixture consisting essentially of an alkyl aluminum compound selected from the group consisting of aluminum alkyl dihalides and sesquihalides, titanium trichloride, and an alkyl phosphonate having the formula

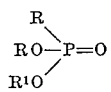

wherein R, and R$^1$ are selected from the group consisting of alkyl and aralkyl groups having 1 to 5 carbon atoms in the alkyl group and wherein the mol ratio of alkyl aluminum compound to titanium trichloride is from about 0.2:1 to about 10:1, and the mol ratio of alkyl aluminum compound to the alkyl phosphonate is from about 1.1:1 to about 3:1.

2. The process according to claim 1 wherein the mol ratio of the alkyl aluminum halide to the titanium trichloride is from about 1.5:1 to about 4:1.

3. The process according to claim 1 in which the titanium trichloride is predominantly amorphous.

4. The process according to claim 1 in which the alkene is propylene.

5. The process according to claim 1 in which the alkyl phosphonate is diethyl ethyl phosphonate.

6. The process according to claim 1 in which the alkyl phosphonate is dibutyl butylphosphonate.

7. The process according to claim 1 in which the alkyl phosphonate is diethyl ethyl phosphonate and the mol ratio of the alkyl aluminum compound to the alkyl phosphonate is from about 1.3:1 to about 2.5:1.

8. The process according to claim 1 in which the alkyl aluminum compound is ethyl aluminum dichloride.

9. The process according to claim 1 in which the alkyl aluminum compound is ethyl aluminum sesquichloride.

10. A catalyst composition consisting essentially of an alkyl aluminum compound selected from the group consisting of alkyl aluminum dihalides and alkyl aluminum sesquihalides; titanium trichloride; and an alkyl phosphonate having the formula

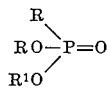

wherein R and R$^1$ are selected from the groups consisting of alkyl and aralkyl groups having 1 to 5 carbon atoms in the alkyl group, the mol ratio of alkyl aluminum compound to titanium trichloride being from about 0.2:1 to about 10:1, and the mol ratio of alkyl aluminum halide to the alkyl phosphonate being from 1.1:1 to about 3:1.

11. A catalyst composition according to claim 10 in which the mol ratio of the alkyl aluminum compound to the titanium trichloride is from about 1.5:1 to about 4:1.

12. A composition according to claim 10 in which the titanium trichloride is essentially amorphous.

13. A composition according to claim 10 in which the alkyl phosphonate is diethyl ethyl phosphonate.

14. A composition according to claim 10 in which the alkyl phosphonate is dibutyl butylphosphonate.

15. A composition according to claim 10 in which the alkyl phosphonate is diethyl ethyl phosphonate and the mol ratio of alkyl aluminum compound to the diethyl ethyl phosphonate is from about 1.3:1 to about 2.5:1.

16. A composition according to claim 10 in which the alkyl aluminum compound is ethyl aluminum dichloride.

17. A composition according to claim 10 in which the alkyl aluminum compound is ethyl aluminum sesquichloride.

References Cited by the Examiner

UNITED STATES PATENTS 2,951,066  8/60  Coover et al. _____ 260—93.7
2,969,345  1/61  Coover et al. _____ 260—93.7

FOREIGN PATENTS 626,206  8/61  Canada.

JOSEPH L. SCHOFER, *Primary Examiner.*

JOSEPH R. LIBERMAN, JAMES A. SEIDLECK,
*Examiners.*